March 25, 1947.  C. B. DINSMORE  2,417,864
MAGNETIC COMPASS COMPENSATING FIELD DEVICE
Filed Feb. 19, 1945
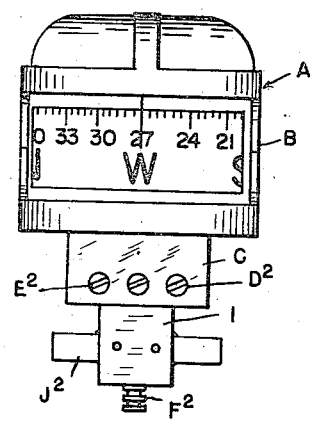
FIG.1.
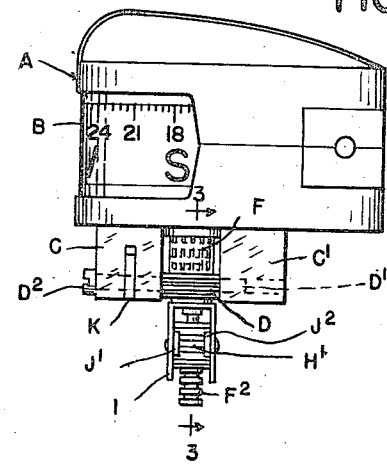
FIG.2.
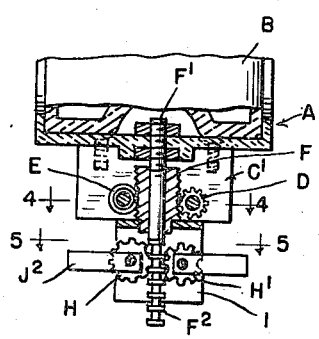
FIG.3.
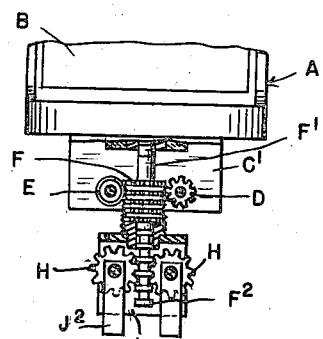
FIG.7.
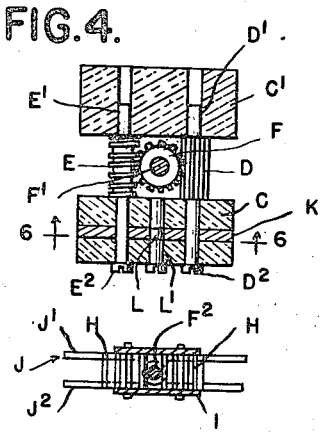
FIG.4.
FIG.5.
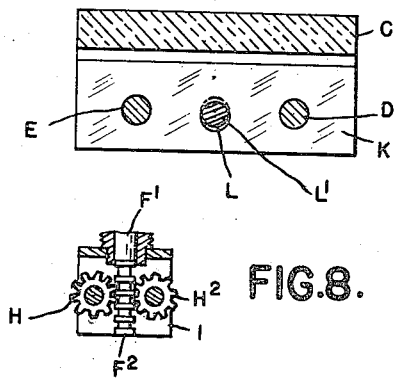
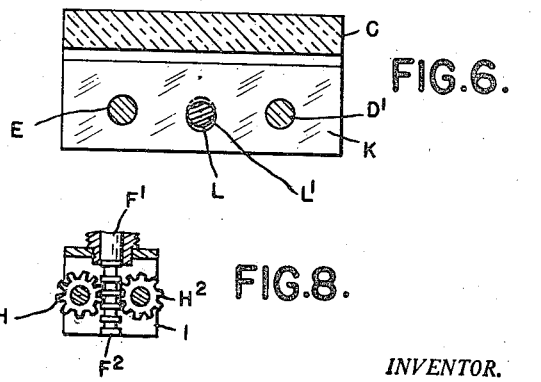
FIG.6.
FIG.8.
INVENTOR.
CLARENCE B. DINSMORE
BY
Whittemore Hulbert & Belknap
ATTORNEYS Patented Mar. 25, 1947

2,417,864

UNITED STATES PATENT OFFICE 2,417,864

MAGNETIC COMPASS COMPENSATING FIELD DEVICE

Clarence B. Dinsmore, Flint, Mich.

Application February 19, 1945, Serial No. 578,638

6 Claims. (Cl. 33—225)

The invention relates to compasses more particularly designed for use in moving vehicles, such as airplanes, automobiles and boats.

It is the object of the invention to obtain simple and effective compensating means which can be easily manipulated when necessary and which is locked from displacement after adjustment has been made.

To this end the invention consists, first, in a compensating means in which the direction of lines of force and the strength or intensity of the compensating magnetic field may be independently adjusted; second, in the means employed for varying the strength of the magnetic field; third, in the means for changing the direction of the lines of force in the field; fourth, in a simple construction of mechanism for accomplishing both of the above functions; and, further, in various features of construction as hereinafter set forth.

In the drawings:

Fig. 1 is an elevation of a compass provided with my improved compensating means;

Fig. 2 is an elevation viewed at right angles to Fig. 1;

Fig. 3 is a vertical central section on line 3—3, Fig. 2;

Fig. 4 is a horizontal section on line 4—4, Fig. 3;

Fig. 5 is a horizontal section on line 5—5, Fig. 3;

Fig. 6 is a section on line 6—6, Fig. 4;

Fig. 7 is a view similar to Fig. 3 showing a different position of adjustment;

Fig. 8 is a view similar to Fig. 3 showing a modified construction.

General features of the compensating means

As the invention relates to the compensating means, the construction of the compass proper is not essential. However, as shown in the drawings, A represents the compass card which is of cylindrical form and B is the casing or frame for supporting the compensating means. As above stated, it is one of the objects of the invention to provide means for independently adjusting the direction of the magnetic lines of force and the strength or intensity of the compensating magnetic field. The first of these functions is accomplished by rotating the energizing magnet or magnets in a horizontal plane parallel to the plane of rotation of the card. The second function is performed by a movement of the horizontal plane of the energizing magnet toward or from the card and also by simultaneously moving the magnets in a vertical plane and in or out of a protective casing or shunt. These two movements coact with each other to increase or diminish the intensity of the field. Thus as will be hereinafter explained in detail, when both poles of each magnet are in the same horizontal plane, they are most effective in intensifying the compensating field and at this time the horizontal plane of the compensating magnet is nearest the plane of the card and extended beyond the shunting effect of the protective casing. On the other hand, when the poles of each magnet are moved out of the same horizontal plane, the strength of the field will be diminished and at the same time the magnet, as a whole, is moved away from the plane of the card which also diminishes the intensity of the field.

Compensating mechanism

The casing or frame B, which is formed of non-magnetic material, is provided with spaced depending portions C and C'. Journaled in these portions and extending therebetween are spaced members D and E, the former provided with axially extending gear teeth and the latter being a helical worm. Between the members D and E is a member F having a vertical axis of rotation in alignment with the rotational axis of the card. The member F is of cylindrical form and is slidably mounted on a shank F' depending from the casing B. On its periphery the member F is provided with intersecting circumferentially extending and axially extending grooves forming teeth for respectively engaging the gear wheel D and the worm E. Thus, rotation of the gear wheel will slide the member F either upward or downward on the shank F' while rotation of the worm will revolve the member F on said shank. The lower end portion of the member F is fashioned to form an annular rack $F^2$ which is in engagement with pinions H and H' on opposite sides thereof. These pinions are journaled in a casing I formed of magnetic metal, such as soft iron and which is secured to the lower end of the member F. Magnets J are also secured to the pinions H and H' and with the specific construction shown in Fig. 5, these are formed by pairs of magnetized bars J', $J^2$ secured at opposite ends of each pinion. The arrangement of the magnetic poles is such that when the bars on the respective pinions are in alignment with each other and arranged in a horizontal plane, their adjacent ends are of unlike polarity so as to form in effect a single magnet. On the other hand, if the pinions are turned through 90°, the bars respectively mounted thereon will extend vertically parallel thereto and will be withdrawn within the casing I, which latter operates as a shield for limiting the extent of the magnetic field. It will be understood that the rotation of the pinions and the swinging of the magnetic bars is due to the vertical movement of the member F and by reason of engagement between the pinions and the annular rack $F^2$. Thus, the rotation of the gear wheel D raises or lowers the member F which, in turn, rotates the pinions and angularly adjusts the magnets. Also, when the member F is moved downward, it will carry the magnets farther away from the plane of the card, while the upward movement of said member will bring the magnets nearer to the plane of the card. This will produce the greatest variation in the strength of the compensating magnetic field for movement of the magnets away from the card also moves them from horizontal to vertical position and into the shield I, while movement in the opposite direction moves the magnets out of the shield into horizontal position and nearer to the plane of the card.

For changing the direction of the magnetic lines of force the member F together with the casing I and magnets J carried thereby may be rotated by the worm E. Such rotation may be effected in any position of vertical adjustment of the member F caused by rotation of the gear wheel D. It is, therefore, apparent that the change in direction of magnetic lines is entirely independent of the intensity of the magnetic field. This is advantageous as it is desirable to make the intensity of the magnetic field only sufficient to effect compensation as any excess in intensity would only interfere with the operation of the card.

The members D and E have shank portions D′, E′ of reduced diameter journaled in bearings in the portions C and C′ of the frame. The forward portions of the shanks D′, E′ are extended beyond the portion C and are provided with slotted ends $D^2$, $E^2$ adapted to be engaged by a screw-driver, preferably one formed of non-magnetic metal. These members may thus be independently adjusted and after adjustment are locked from displacement. The locking mechanism preferably comprises a plate K located in a slot in the member C and bored for the passage of the shanks D′, E′. There is also a central aperture in the plate which is engaged by a cam L on a shank L′ extending forward through the portion C. The forward end of this shank is slotted to be turned by a screwdriver and the cam will thus place sufficient lateral pressure on the plate K to bind the shanks D′, E′ therein.

A modified construction is shown in Fig. 8 in which pinions $H^2$ are formed of magnetic metal and are polarized to constitute the energizing magnets for creating the magnetic field. When these pinions are turned in the position shown in Fig. 8, the poles are in the same horizontal plane which will create a most intense magnetic field. On the other hand, if the pinions are rotated through 90°, the poles of the pinions will be arranged in parallel vertical planes and will be shielded by the casing I. The effect is, therefore, much the same as in the construction previously described.

What I claim as my invention is:

1. In a compass, the combination with the card, of a magnet for creating a compensating field, means for adjusting said magnet from a horizontal plane to a vertical plane, and a shield within which said magnet is withdrawn when moved towards said vertical plane.

2. In a compass, the combination with the card, of a magnet for creating a compensating magnetic field, means for adjusting said magnet from a horizontal towards a vertical position, means for moving said magnet bodily away from said card during its adjustment from horizontal towards vertical positions, and a shield within which said magnet is withdrawn when passing from horizontal to vertical position.

3. In a compass, the combination with the card, of a magnet for creating a compensating magnetic field and mechanism for adjusting said magnet including a stationary shank vertically extending in alignment with the axis of the card, a member slidable on said shank having intersecting axially and circumferentially extending teeth, a gear wheel in mesh with the circumferentially extending teeth, a worm in mesh with the axially extending teeth, a pivotal mounting for said magnet secured to said slidable member, a pinion secured to said magnet, an annular rack formed on the lower portion of said stationary shank and engaging said pinion, and means for alternatively rotating said gear wheel and said worm, the former raising or lowering said slidable member and rocking said magnet between horizontal and vertical positions and the latter rotating said slidable member and the magnet carried thereby about the axis of the card.

4. In a compass, the combination with the card, of a magnet for creating a compenasting field and mechanism for adjusting said magnet including a member carrying said magnet mounted for rotary and axial movement respectively about the axis of said card and towards or from the plane of said card, said member being provided with intersecting axially and circumferentially extending teeth, a gear wheel on one side of said member in mesh with said circumferentially extending teeth, and a worm on the opposite side of said member in mesh with said axially extending teeth.

5. In a compass, the combination with the card, of a magnet for creating a compensating field and mechanism for adjusting said magnet including a member carrying said magnet mounted for rotary and axial movement respectively about the axis of said card and towards or from the plane of said card, said member being provided with intersecting axially and circumferentially extending teeth, a gear wheel on one side of said member in mesh with said circumferentially extending teeth, a worm on the opposite side of said member in mesh with said axially extending teeth, and parallel shanks for said gear and worm independently revoluble to respectively alter the strength of the magnetic field and change the direction of magnetic lines of force with reference to said card.

6. In a compass, the combination with the card, of a magnet for creating a compensating field and mechanism for adjusting said magnet including a member carrying said magnet mounted for rotary and axial movement respectively about the axis of said card and towards or from the plane of said card, said member being provided with intersecting axially and circumferentially extending teeth, a gear wheel on one side of said member in mesh with said circumferentially extending teeth, a worm on the opposite side of said member in mesh with said axially extending teeth, parallel shanks for said gear and worm independently revoluble to respectively alter the strength of the magnetic field and change the direction of magnetic lines of force with reference to said card, and locking means for said shanks to prevent accidental rotation thereof.

CLARENCE B. DINSMORE.

REFERENCES CITED

The following references are of record in the file of this patent:

UNITED STATES PATENTS

| Number | Name | Date |
|---|---|---|
| 2,048,920 | Colvin | July 28, 1936 |

FOREIGN PATENTS

| Number | Country | Date |
|---|---|---|
| 752,414 | French | July 17, 1933 |